US006792142B1

(12) United States Patent
Wang

(10) Patent No.: US 6,792,142 B1
(45) Date of Patent: Sep. 14, 2004

(54) IMAGE SENSING SYSTEM WITH HISTOGRAM MODIFICATION

(75) Inventor: Yibing Michelle Wang, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 562 days.

(21) Appl. No.: 09/761,218

(22) Filed: Jan. 16, 2001

(51) Int. Cl.$^7$ .............................. G06K 9/00; G06K 9/36; G06K 9/68
(52) U.S. Cl. .................. 382/172; 382/232; 382/218
(58) Field of Search .................................. 382/168, 170, 382/171, 172, 232, 218, 237, 369, 242, 251, 284; 358/522, 530, 443

(56) References Cited

U.S. PATENT DOCUMENTS

| 5,710,828 | A | * | 1/1998 | Hashimoto | ................. 382/172 |
|---|---|---|---|---|---|
| 5,729,632 | A | * | 3/1998 | Tai | ............................. 382/237 |
| 5,761,344 | A | * | 6/1998 | Al-Hussein | ................. 382/237 |
| 5,809,177 | A | * | 9/1998 | Metcalfe et al. | ........... 382/251 |
| 5,815,606 | A | * | 9/1998 | Baker et al. | ................ 382/237 |
| 5,995,671 | A | * | 11/1999 | Nagarajan et al. | ......... 382/242 |
| 6,141,450 | A | * | 10/2000 | Chen et al. | ................. 382/237 |
| 6,307,962 | B1 | * | 10/2001 | Parker et al. | ............... 382/170 |
| 6,347,156 | B1 | * | 2/2002 | Kamada et al. | ............ 382/237 |

* cited by examiner

*Primary Examiner*—Andrew W. Johns
*Assistant Examiner*—Amir Alavi
(74) *Attorney, Agent, or Firm*—Dickstein Shapiro Morin & Oskinsky LLP

(57) ABSTRACT

A histogram is modified by using an adaptive system. Two different thresholds are set: a threshold of a number of pixels which can be changed, and another threshold indicative of a total number of pixels which can be combined together. The thresholds can be adaptively based on results of frame operations.

16 Claims, 4 Drawing Sheets

Modified Histogram

Original Histogram

Modified Histogram

IMAGE SENSING SYSTEM WITH HISTOGRAM MODIFICATION

BACKGROUND

Many different image sensing systems are known in the art.

Viewing of images is limited by the resolution of the viewing screen that is being used. Sometimes, however, the resolution of a view screen is not sufficient to see a specified image, especially one with motion.

For example, a high dynamic range scene may have a dynamic range of 18 bits or even more. This would require a display device that could display $2^{18}$ resolvable levels of brightness. Many display devices today, however, show only $2^8$=256 levels of brightness.

It is desirable to display an image on such a display while preserving much of its detailed information. Dynamic range compression can be used for this purpose.

It is known to compress dynamic range using logarithmic compression, homomorphic filtering, "cut and paste" methods, and histogram equalization and adjustment. Logarithmic compression carries out a transformation of $$s = 255 \times \frac{\log(1 + |g|) - \log(1 + |Gmin|)}{\log(1 + |Gmax|) - \log(1 + |Gmin|)} \quad (5.1)$$

Homomorphic filtering is a frequency domain procedure which associates low frequencies of a Fourier transform of the log of the image with illumination high frequencies. These are associated with reflectance using a filter which associates low-frequency with illumination and high frequency with reflectance.

The cut and paste methods cuts data blocks from different intensity images and pastes them into one background image at corresponding locations. This may produce a gray level which is not a monotonic response to light level, which may produce distortion in the final displayed image.

BRIEF DESCRIPTION OF THE DRAWINGS

These and other aspects will now be described in detail with reference to the accompanying drawings, wherein.

SUMMARY

The present application teaches a system of histogram modification that compresses dynamic range of an image into regions which have fewer samples.

The present application uses a new form of histogram compression which determines areas which have less information therein, and compresses them. The compression is based on a number of observations, including the way that the human eye perceives light intensity levels.

DETAILED DESCRIPTION

The present application relies on compression of histograms in a special way.

Figure 1:
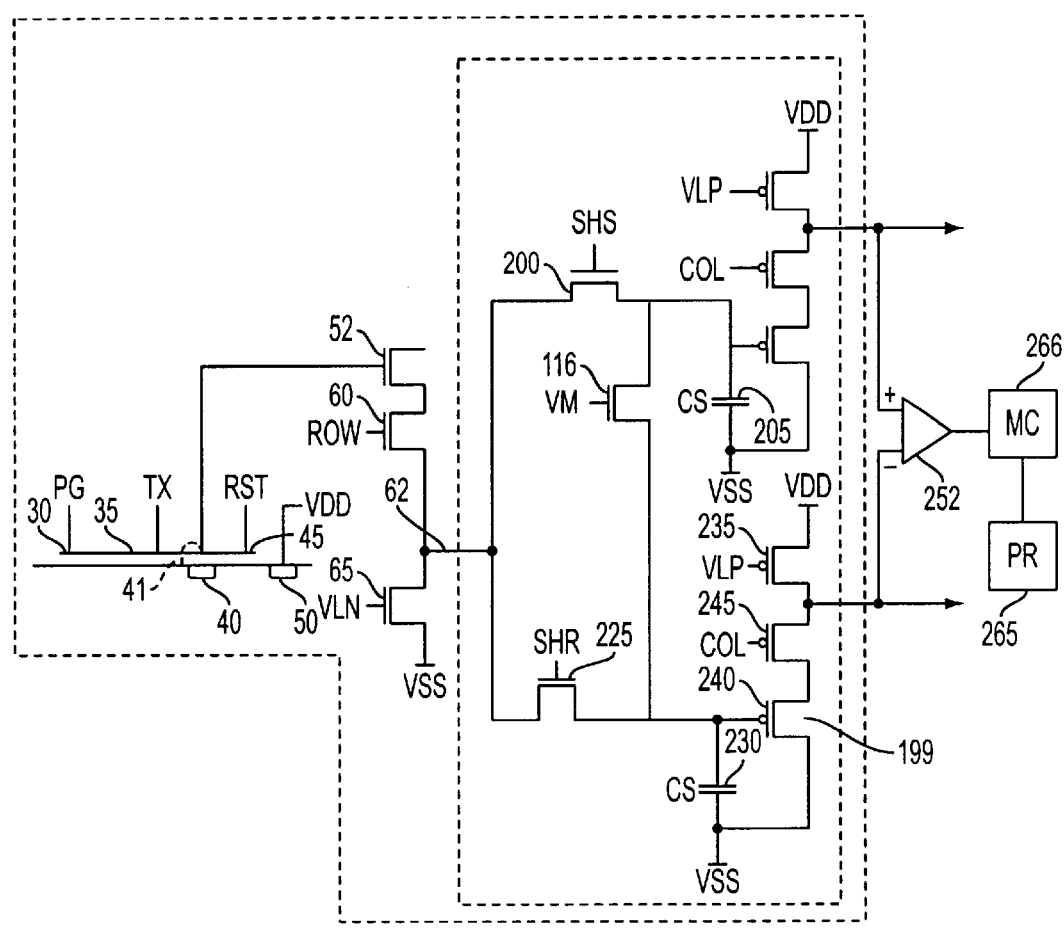
FIG. 1 shows a system level view of the modification system.

A basic system formed of an active pixel sensor is shown in FIG. 1. The active pixel sensor in FIG. 1 uses a photogate 30 which accumulates charge under or adjacent to the structure. However, any other photoreceptor element, such as a charge injection device, pinned photodiode or other photodiode could be used.

The accumulated charge can be transferred by pulsing a PG to force charge through a transfer gate 35 to a floating diffusion 40. Floating diffusion 40 can also be reset to a reset level ($V_{DD}$) that is present in diffusion 50. Reset gate 45 is activated to carry out the reset.

Each pixel includes at least two transistors: a first transistor 65 configured as a follower, and a second transistor 60 configured as a pixel selector. The output of each pixel 62 is connected to a processing circuit, which in this case is common to an entire column of pixel devices. The processing circuit may include a correlated double sampling circuit 199, that samples the signal level by turning on transistor 200 and sampling it on to capacitor 205. The reset level can also be sampled by turning on transistor 225 and sampling that reset level onto capacitor 230. Then, the difference between the two capacitance levels is obtained by a differential amplifier 252.

The column select circuitry also shows column selecting transistors such as 240, which enables selecting a specific column at a specific time.

The output of the pixel is accumulated in a specified way. According to the present application, the pixels may be processed on the fly, without a memory. A processor element 265 can then image process the pixels. This processor element can be a dedicated processor which carries out instructions, a specialized image processor, such as an image processor chip, a DSP which is configured for image processing, or analog gates which are arranged by using hardware definition language to carry out a specified function. The image processing carried out herein uses a special form of histogram equalization as described.

Figure 2:
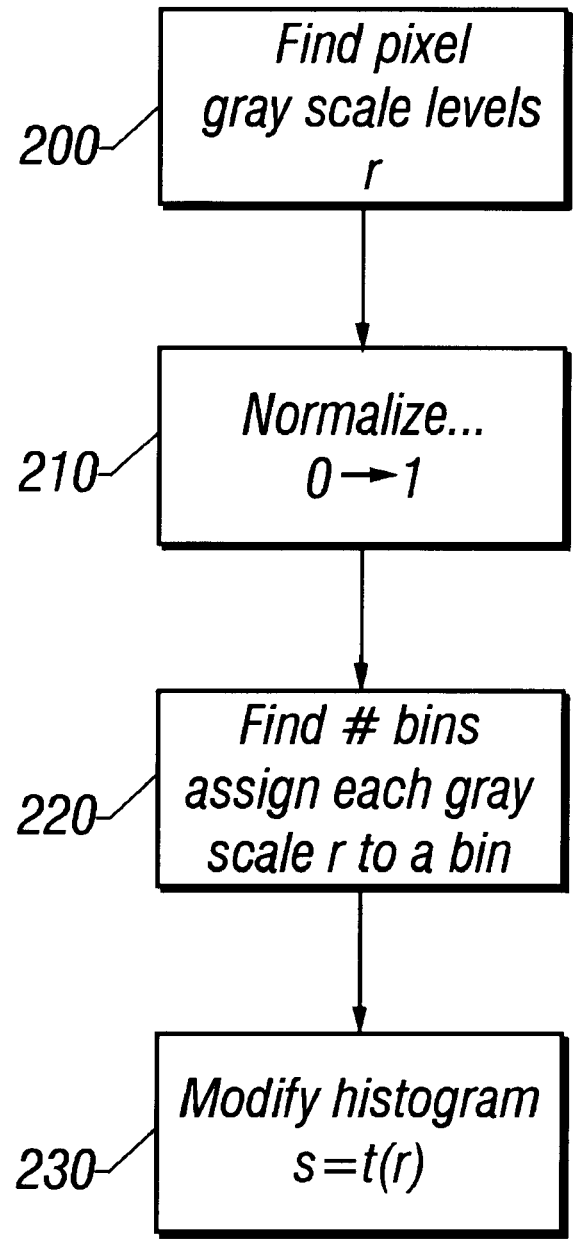
FIG. 2 shows a system level flowchart.

The histogram modification is carried according to the general flowchart of FIG. 2.

At 200 the gray scale of each image pixel in the memory is found. For convenience, the gray scale level, here r, is normalized at 210 to values extending between 0 and 1, with 0 representing total black and 1 representing total white. A number of histogram bins are constructed, set, for example, by the number of levels in the image sensor. At 220, each of the image pixels is binned, that is, assigned to a bin of the histogram.

At 230, the histogram is modified. In general, histogram modification produces a new level s for every pixel value r in the original image such that s=t(r), where t is the transformation function.

According to the present system, the transformation function may have the characteristic that t(r) is single valued and monotonically increasing in the interval of 0 to 1. This preserves the order from black to white in the gray scale. T(r) should also be between 0 and 1 for r between 0 and 1. This provides a mapping that is consistent with the allowed range of pixel values.

An inverse transformation may also be defined as $r=t^{-1}(s)$, with s between 0 and 1.

The original gray levels r in the image may be random quantities. The transformed gray levels s, however, can be characterized by any desired feature based on t. For example, the probability densities of the transformed values can be used. However, previous systems have compressed not only the dynamic range, but also compressed contrast in the most highly populated regions of the histogram. Contrast in large areas of the image may thereby become exaggerated.

A Visibility Matching Tone Reproduction Operator for High Dynamic Range Scenes", Tech Rep LBNL-39883, Lawrence Berkeley National Laboratory, March, 1997 by Ward, describes a system that which while useful, requires iteration to form a tolerance criterion.

According to the present system, the waveform or image content of the histogram is investigated to find its dip areas, i.e., the areas with relatively fewer pixels falling on them. These gray levels are less noticed when one views the entire image. Therefore, this dip area of the histogram represents the part of the image that has a dynamic range that is not being as effectively noticed as others.

The present system compresses these dip areas.

This compresses the entire dynamic range of the image. It also simultaneously enhances the image. In addition, as described in the Ward publication described above, the eye is really most sensitive to the presence in an image of bright areas and dim areas. As long as the bright areas are displayed by higher luminances than the dim areas, the absolute value of the difference becomes less noticeable.

Figure 3:
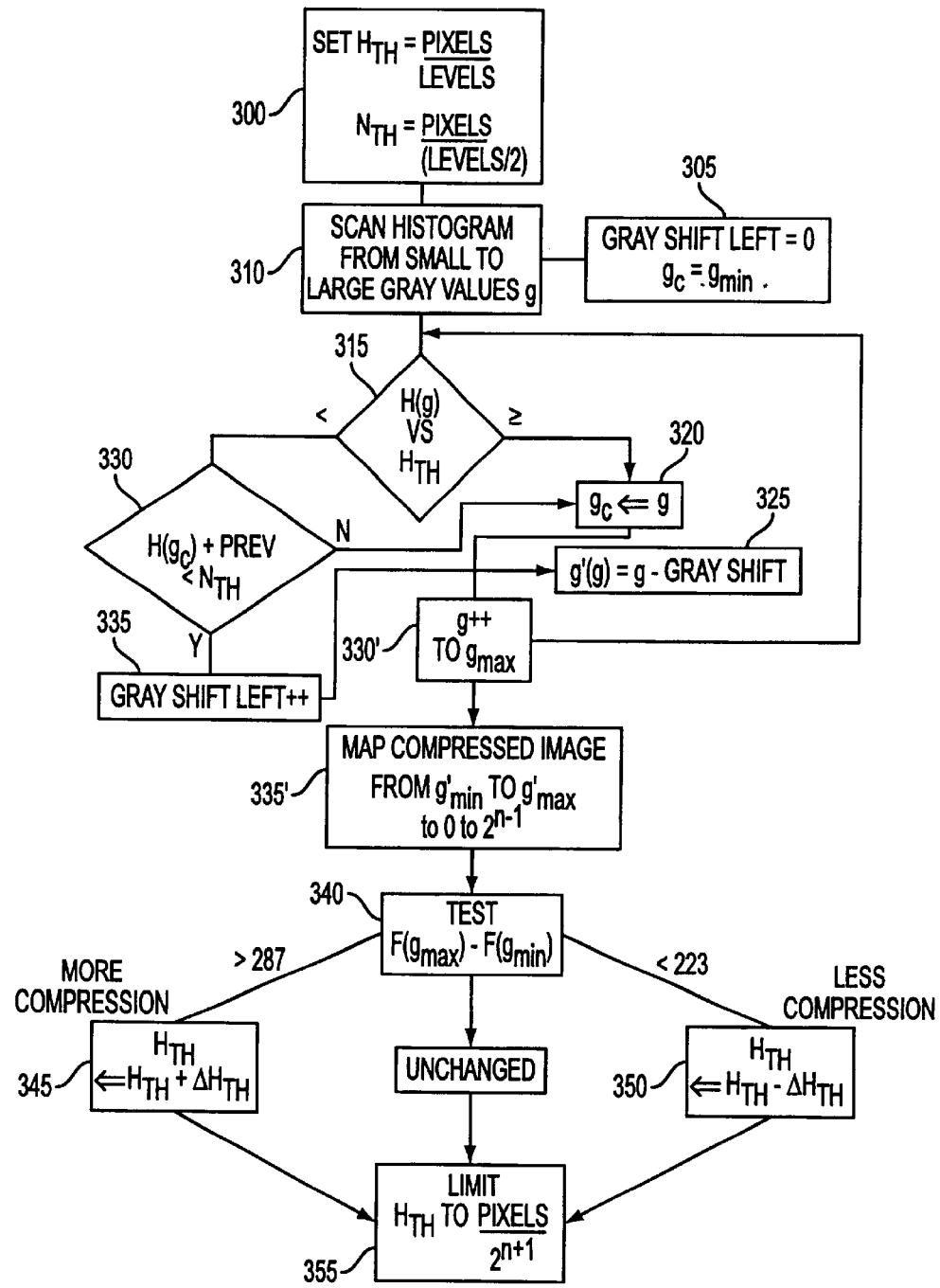
FIG. 3 shows a more detailed flowchart.

The dip compression system of the present application operates as shown in the flowchart of FIG. 3. This may process frames of information obtained from an active pixel sensor. The system starts with an initialization at 300. This sets a threshold value Hth to an initial value of the number of pixels divided by the number of levels. Another threshold value $N_{th}$ is set to pixels divided by (levels/2) $N_{th}$ limits the total number of pixels that can be combined together. This is done to prevent generation of another peak in the histogram dip area which could itself cause unwanted effects in the image. The $N_{th}$ is also referred to herein as the pixel sum.

The thresholds can be set to other values. For example, $H_{TH}$ may be is initially set to (number of pixels in the image)/$2^{n+2}$.

The Pixel sum may initially set to (the number of pixels in the image)/2.

Local values are also set at 305 including the GRAY_SHIFT_LEFT value which is set equal to 0, and the value of the common last gray value ($g_c$) which set to the minimum value of the gray scale minimum value $g_{min}$. $G_{min}$ will equal 0 if the normalization described above has been used.

The image is then processed, by comparing each bin of the histogram to the thresholds, and adjusting different values based on the comparison.

At 310, the histogram is scanned from small to large gray values g. Each histogram value H(g) is compared with the current threshold $H_{th}$ at 315. If the current H(g) is greater than the threshold $H_{TH}$, then the common gray value $g_c$ is set to the current g at 320, the new gray level g'(g) is set to (g-GRAY_SHIFT_LEFT) value at 325 and g is incremented at 330. The process then returns to 315 which compares the new histogram value H(g) with the threshold $H_{TH}$.

If the histogram value H(g) is not greater than the threshold at 315, then flow passes to the left at 315 which causes modification of the histogram. In this case, first a test is made to make sure that the total number of pixels to combine together does not exceed the threshold limit $N_{TH}$. This is shown in 330, where the histogram value of the last common value h(gc) is added to the previous sums and compared against the pixel sum threshold $N_{TH}$. If the value is still below the threshold, GRAY_SHIFT_LEFT is incremented at 335, and again the operation occurs by flow passing to 325 where the new gray level is set to the new gray shift left value, and g is incremented.

If the previous value does exceed the pixel sum, then the current pixel value is set and the operation proceeds to step 320 just as if the current value has exceeded the threshold. Writing this in more mathematical terms.

If H(GC)+(G−GC+1)H(GC+1)+(G−GC)H(GC+2)+ . . . +3H(G−1)+2H(G)<PIX_SUM, (*the new accumulated value is less then the pixel sum*) then GRAY_SHIFT_LEFT++ else loop.

When g max is reached at 330', the entire frame has been mapped to a new histogram. 335' maps the compressed image from g' min to g' max to 0 to $2^{n-1}$. This provides mapping of the current frame. At 340, the new minimum and maximum gray levels g' min and g' max are checked.

After the frame has been completely processed, the results may be used to adaptively change the threshold(s). An allowable range for the threshold is set, here between pixels/$2^{n+3}$, and pixels/$2^{n+1}$. The threshold can have any value between two extremes. According to this system, if g'max minus g'min is greater than $2^{n+2}+2^{n-3}$ (here 287), then more compression is requested at 345. Here 345 shows increasing the threshold by a value $\Delta H_{TH}$. Conversely, if g'max minus g'min is less than $2^{n-2}-2^{n-3}$ (here 223), then less compression is requested at 350 by decreasing the threshold by $\Delta H_{TH}$. The new threshold is limited to pixels/$2^{n+1}$ at 355. After this operation, the next frame is processed, by passing control to 305 which resets the GRAY_SHIFT_LEFT level and the common gray level for the next frame and repeats the operation.

Figure 4:
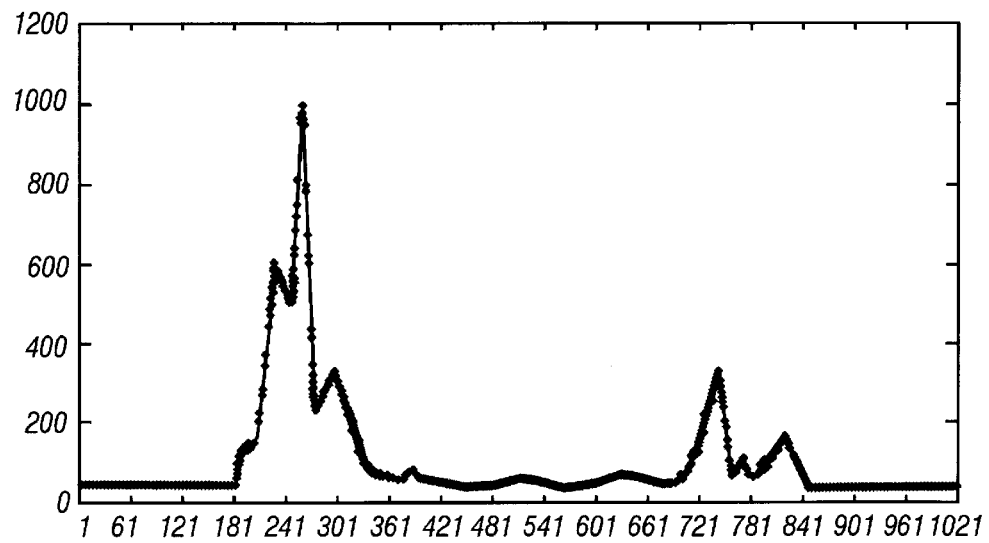
FIGS. 4 and 5 show an original histogram and a modified histogram, respectively.
Figure 5:
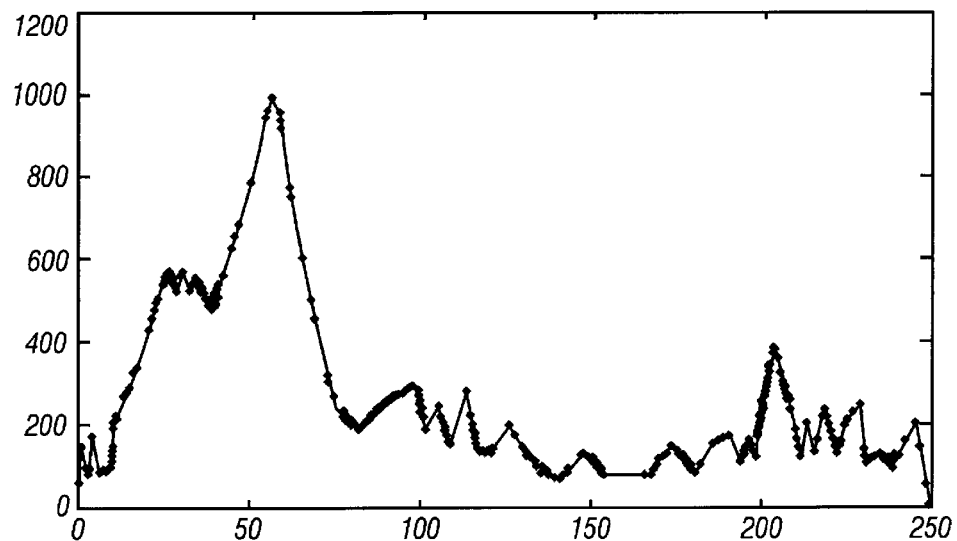

The constraint functions in 340–355 can reduce gaps between peaks of the histogram without convergence. In this way, the original histogram can be modified to be better viewed. For example, FIG. 4 shows an original histogram of a sample image. This is modified as shown in FIG. 5 to show the modified histogram. Note that many of the peaks remain the same.

This is called a weighted sum constraint function.

What is claimed is:

1. A method of compressing an image, comprising:
   determining components of an image by reading out signals from a plurality of pixels, and arranging said components based on their gray scale values;
   determining which gray scale values have a number of pixels that is less than a first threshold number of pixels, said first threshold number based on the total number of pixels divided by a dividing value; and
   compressing said gray scale values which have said number of pixels less than said first threshold, by combining together multiple grey gray scale values.

2. The method as in claim 1 further comprising setting a second pixel threshold, said second pixel threshold representing a number of total gray scale values which can be compressed, and compressing said gray scale values which have an associated number of pixels less than said first threshold until said second threshold has been reached.

3. The method as in claim 2 further comprising setting an initial value for each of said first and said second threshold values, and adjusting said threshold values from said initial values based on results of said image processing.

4. A method of compressing an image, comprising:
   determining a gray scale level for each of a plurality of pixels receiving an image;
   normalizing the gray scale levels;
   arranging the normalized gray scale levels to determine the number of pixels having each of said levels;
   setting a first threshold value;
   comparing the number of pixels associated with each of the levels to said first threshold value;
   compressing said gray scale levels which have an associated number less than said first threshold value.

5. The method of claim 4, wherein said step of normalizing comprises assigning each gray scale level to a number between 0 and 1.

6. The method of claim 5, wherein a "0" on the normalized gray scale represents black and a "1" represents white.

7. The method of claim 4, wherein the step of setting a threshold value comprises dividing the total number of pixels by a dividing value.

8. The method of claim 7, wherein the step of setting a threshold value comprises dividing the total number of pixels by the total number of gray scale levels.

9. The method of claim 7, further comprising the step of setting a second threshold value and limiting the number of gray scale values which can be compressed using said second threshold.

10. The method of claim 9, wherein said second threshold value is initially set to the number of pixels divided by half of the number of levels.

11. The method of claim 10, wherein said second threshold value is variable.

12. A method of processing an image comprising:

receiving at a processor a signal from each of a plurality of pixels corresponding to a frame of an image applied to said pixels;

determining a gray scale value for each said received signal;

determining the number of pixels associated with each individual gray scale value;

comparing said number to a first predetermined threshold value, said comparing for each associated gray scale value; and combining together at least two gray scale values that have an associated number of pixels less than said threshold value to form a different gray scale value.

13. The method of claim 12, further comprising normalizing said gray scale values.

14. The method of claim 13, wherein the step of normalizing the gray scale values is performed sequentially between the steps determining a gray scale value for each said received signal and determining the number of pixels associated with each individual gray scale value.

15. The method of claim 12, further comprising the step of limiting the number of gray scale values that can be combined based on a second pre-determined threshold.

16. The method of claim 15, wherein the second pre-determined threshold is initially set to the number of pixels divided by half the number of gray scale levels.

* * * * *

UNITED STATES PATENT AND TRADEMARK OFFICE
CERTIFICATE OF CORRECTION

| | |
|---|---|
| PATENT NO. | : 6,792,142 B1 |
| APPLICATION NO. | : 09/761218 |
| DATED | : September 14, 2004 |
| INVENTOR(S) | : Yibing Michelle Wang |

It is certified that error appears in the above-identified patent and that said Letters Patent is hereby corrected as shown below:

Column 3, line 26, change "(levels/2) $N_{th}$)" to --(levels/2). $N_{th}$--.

On the title page item [56],
<u>In the References Cited under heading "Other Publications"</u>, add the following citation:

G. Larson, "A Visibility Matching Tone Reproduction Operator for High Dynamic Range Scenes", Tech Rep LBNL-39883, Lawrence Berkeley National Laboratory, 1997.

Signed and Sealed this

Eleventh Day of July, 2006

JON W. DUDAS
*Director of the United States Patent and Trademark Office*